Nov. 8, 1960 D. R. HOUSTON ET AL 2,959,781

AUTOMATIC GAIN CONTROL SYSTEM

Filed May 21, 1957

INVENTORS
DAVID R. HOUSTON
MELVIN P. SIEDBAND
CHARLES C. RYAN

BY R. I. Tompkins
ATTORNEYS 2,959,781

AUTOMATIC GAIN CONTROL SYSTEM

David R. Houston, North Linthicum, Melvin P. Siedband, Baltimore, and Charles C. Ryan, Glen Burnie, Md., assignors, by mesne assignments, to the United States of America as represented by the Secretary of the Navy Filed May 21, 1957, Ser. No. 660,727

6 Claims. (Cl. 343—17.1)

The present invention relates to an automatic gain control system for use with radiant energy receivers wherein signals are received intermittently and for short periods of time and more particularly to an automatic gain control system operable to provide a gain control voltage for the receiver of a search-while-track radar system during the search-track phase of operation thereof.

Certain types of search-while-track radar systems operate in three phases:

(1) The acquisition phase—during which a target is continuously illuminated, (2) The search-track phase—during which a plurality of targets are periodically and successively illuminated, and (3) The track phase—during which a selected target is continuously illuminated.

It is necessary to provide an automatic gain control voltage for the radar receiver during each of the above mentioned phases of operation in order to permit operation of the receiver in its linear dynamic range—neither below noise level nor above saturation level. At the same time, in order to permit location of the center of the target return signal, the gain control system must not operate to remove the target return signal modulation.

During the acquisition and track phases, a gain control voltage may be provided by the normal automatic gain control system which would normally be present in the radar receiver. This system provides a gain control voltage that is a function of target range, size, and position or velocity. However, during the search-track phase, target return signals are available only intermittently and for very short periods of time, for example, 0.035 second for each four second frame (scanning cycle). The normal automatic gain control system of the radar receiver has neither the time response characteristics nor the storage capacity to operate successfully upon signals of this character.

In a known search-while-track system, a voltage proportional to target range is available during the search-track phase. It would therefore be possible to provide a system to generate a gain control voltage as a function of range and by providing means to correct the range function voltage for target size, aspect angle, etc., to develop the required gain control voltage. While such a system would be better than a system employing a gain control voltage of arbitrary variation, the system would be prohibitively complex requiring special curve generators, voltage adders, etc.

The present invention comprises a simple and reliable gain control system capable of operating upon intermittent short duration signals and, when used with a search-while-track system, is capable of taking into account with sufficient accuracy the effects of target size, range, and velocity or position. There is provided a peak reading video pulse stretcher (box-car circuit) connected to be energized by the output of the receiver during the interval that signals are being received, a storage and memory circuit coupled to the pulse stretcher during the interval that signals are not being received, and in a search-while-track application, means utilizing the normal gain control system to impress upon the storage and memory circuit the initial conditions of target range, size, etc. The output of the storage and memory circuit is coupled to the receiver to provide the required gain control voltage.

It is an object of the present invention to provide an automatic gain control system adapted for use with radiant energy receivers wherein signals are received intermittently and for short periods of time.

It is a further object of the present invention to provide an automatic gain control system to develop a gain control voltage for a search-while-track radar system during the search-track phase of operation thereof.

It is a more specific object of the present invention to provide an automatic gain control system of the character described next above upon which may be impressed the initial conditions of target range, size, and position.

It is a still further object of the present invention to provide in a search-while-track radar system a receiver gain control system that does not obscure target return signal modulation.

Other objects and many of the attendant advantages of this invention will be readily appreciated as the same becomes better understood by reference to the following detailed description when considered in connection with the accompanying drawings wherein.

Figure 1:
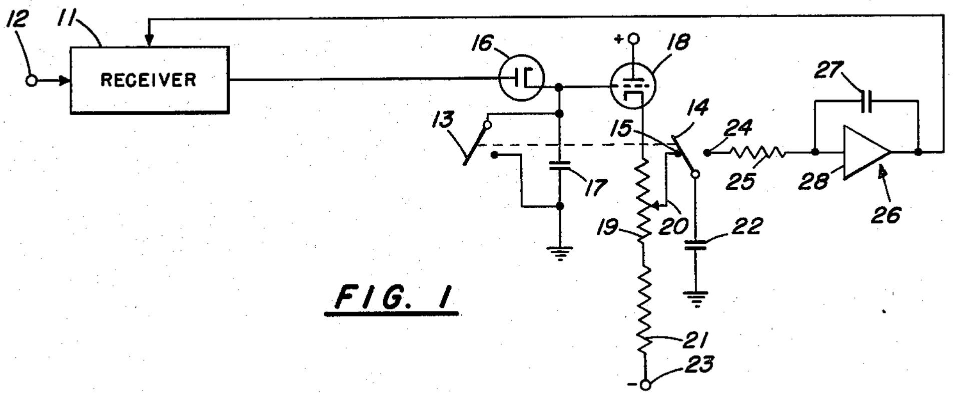
Fig. 1 illustrates a simplified embodiment of the invention.

Referring now to Fig. 1, there is shown a radiant energy receiver 11 which may, for example, be a radar receiver. Periodically, and for short periods of time, input signals from an input terminal 12 are supplied to receiver 11. A switching mechanism (not shown) actuates movable switch contact 13 to the open position and movable contact 14 to engage stationary contact 15 during the time that signals are being received. The received signals are coupled through a diode 16 to a box-car capacitor 17. Since diode 16 prevents reverse conduction, capacitor 17 will charge to the peak value of the received signals. Thus, diode 16 and capacitor 17 together comprise a peak reading circuit as well as a pulse stretching and storage circuit. Since diode 16 and capacitor 17 perform a pulse stretching function (as well as a storage function) this circuit will be referred to by the expression "box-car circuit" familiar to the radar art and capacitor 17 will be referred to as a box-car capacitor. The potential impressed upon capacitor 17 is coupled through a cathode follower circuit comprising a triode 18, potentiometer 19, and cathode resistor 21 to a transfer capacitor 22. The reference potential applied to terminal 23 of cathode resistor 21 is selected and the position of wiper arm 20 of potentiometer 19 is adjusted so that only potentials above a selected threshold value are transferred to transfer capacitor 22. Thus capacitor 22 charges positively for strong signals, negatively for weak signals, and not at all for signals at the threshold value.

During the period of time that signals are not being received, the switching mechanism actuates movable contact 13 to the closed position (to discharge capacitor 17) and movable contact 14 to engage stationary contact 24. Switch contact 14 in this latter position connects capacitor 22 through a coupling resistor 25 to a storage and memory circuit 26 which comprises a capacitor 27 and a high gain direct coupled amplifier circuit 28. Depending upon the relative magnitudes of capacitors 22, 27, each time switch contact 14 is actuated to engage stationary contact 24, a portion of the charge on capacitor 22 will be transferred to capacitor 27. Amplifier circuit 28 in addition to cooperating with capacitor 27 to integrate the incremental voltages received from the box-car circuit operates to maintain the charge on capacitor 27 substantially constant between charging intervals by presenting a large discharge impedance to capacitor 27. The output from storage and memory circuit 26 which comprises the automatic gain control voltage is coupled to receiver 11 to control the gain thereof to thus maintain receiver 11 in the linear dynamic portion of its operating characteristics.

During the next period of time that signals are being received, the switching mechanism actuates switch contacts 13 and 14 to the position first described and the cycle of operation described is repeated.

Figure 2:
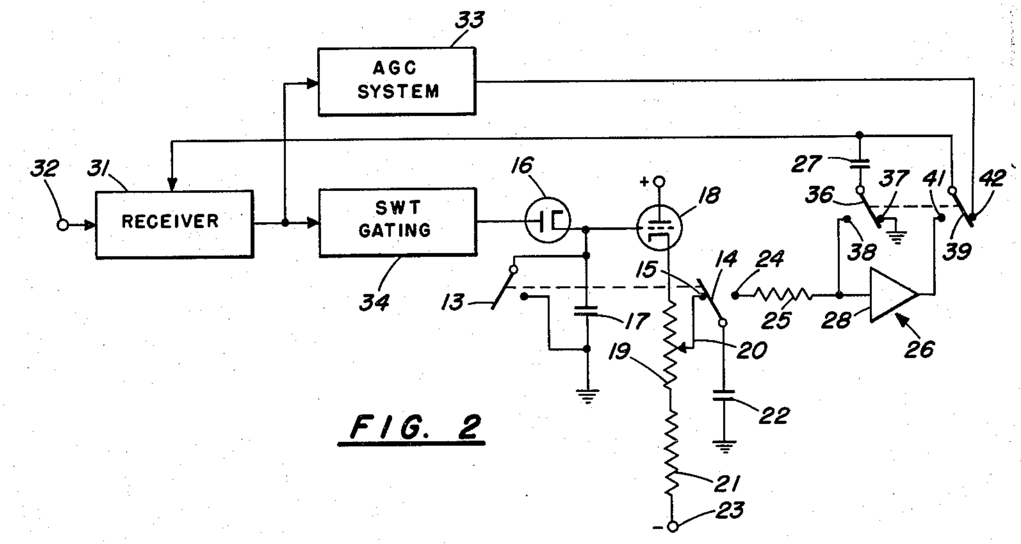
Fig. 2 illustrates an embodiment of the invention in combination with pertinent portions of a search-while-track radar system.

Referring now to Fig. 2, there is shown, in addition to the elements shown in Fig. 1, a switching mechanism comprising movable contacts 36, 39 and stationary contacts 37, 38, 41, and 42, and portions of a search-while-track radar system comprising a radar receiver 31, an automatic gain control system 33 and a search-while-track gating system 34. During the acquisition phase, a switching mechanism (not shown) actuates switch contacts 36, 39 to respectively engage stationary contacts 37, 42. Thus it may be seen that during the acquisition phase, automatic gain control system 33, in addition to providing a gain control voltage for receiver 31, charges capacitor 27 through stationary contact 42, movable contact 39, movable contact 36, stationary contact 37 and ground (or other source of reference potential) to a voltage corresponding to the initial conditions of target range, size, etc.

Figure 3:
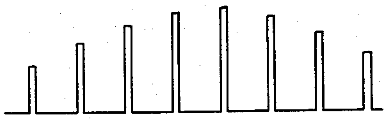
Fig. 3 is a waveform illustrating a modulated target return signal.
Figure 4:
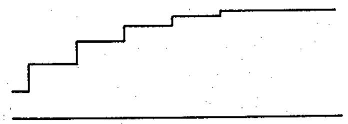
Fig. 4 is a waveform illustrating the step transfer of charge from a transfer capacitor to the storage and memory circuit when the periodically received signals are increasing in amplitude.

When the search-track phase of operation begins, the switching mechanism actuates movable contacts 37, 39 to engage stationary contacts 38, 41 to thereby connect capacitor 27 across amplifier 28. Each time the target is illuminated and the center of the target return has been located, the detected output of receiver 31, shown in Fig. 3, is coupled through gating circuit 34 to the box-car circuit. Thereafter, the charge on capacitor 22 is transferred to capacitor 27 as a correction voltage in the manner described above. If successive groups of target return signals are increasing in amplitude due to a change in target range, aspect, etc., the transfer of charge to capacitor 27 will be as shown in Fig. 4.

Switch contacts 13, 14, and 36, 39 may be respectively actuated by conventional relay mechanisms energized by appropriate voltages available from the search-while-track circuits of the radar system.

There has thus been described and shown in Fig. 2, an automatic gain control system for a search-while-track radar system which is not only capable of responding to intermittently supplied target information but which also takes into account the initial conditions of target range, size, etc.

Obviously many modifications and variations of the present invention are possible in the light of the above teachings. It is therefore to be understood that within the scope of the appended claims the invention may be practiced otherwise than as specifically described

What is claimed is:

1. An automatic gain control system for use with a radiant energy receiver, wherein signals are intermittently received for short periods of time, comprising: means coupled to said radiant energy receiver to generate a voltage proportional to the peak magnitude of the received signals, amplifier and parallel-connected capacitor means to integrate and store said generated voltage, relay means to couple said integrating and storage means to said voltage generating means during the period of time that signals are not being received, and circuit means connecting the output of said integrating and storage means to said radiant energy receiver to control the gain thereof.

2. The combination of claim 1 wherein said voltage generating means comprises a box-car capacitor, rectifying means having said box-car capacitor in its cathode circuit coupling said box-car capacitor to said receiver, said receiver being coupled to the plate of said rectifying means, a transfer capacitor, and impedance transforming means coupling said box-car capacitor to said transfer capacitor.

3. In a search-while-track radar system including a radar receiver, a search-while-track gating system coupled to the output of said receiver and a normal automatic gain control system coupled to the output of said receiver for generating a gain control voltage for said receiver proportional to target range, size and position, an automatic gain control system comprising: an integrating and storage circuit, circuit means coupling the output of said normal automatic gain control system to said integrating and storage circuit, means coupled to said search-while-track gating system for generating a voltage proportional to the peak amplitude of received signals, periodically operated means for coupling said voltage generating means to said integrating and storage circuit, and circuit means coupling the output of said integrating and storage circuit to said receiver to control the gain thereof.

4. The combination of claim 3 wherein said voltage generating means comprises a box-car capacitor, rectifying means coupling said box-car capacitor to said gating system, a transfer capacitor, and impedance transforming means coupling said box-car capacitor to said transfer capacitor.

5. The combination of claim 4 wherein said integrating and storage circuit comprises a storage capacitor and a high gain direct coupled amplifier connected in parallel with said storage capacitor to maintain the charge on said capacitor substantially constant during the period of time that signals are not being received.

6. The combination of claim 5 wherein said circuit means to couple said normal automatic gain control system to said integrating and storage circuit comprises a first relay means to connect said normal automatic gain control system to said receiver and to said storage capacitor during the acquisition phase of operation of said search-while-track radar system and to connect said storage capacitor in parallel with said operational amplifier during the search-track phase of operation of said search-while-track radar system, and wherein said periodically operated means comprises second relay means to connect said box-car capacitor to said gating system during said search-track phase while signals are being received and to connect said transfer capacitor to said integrating and storage circuit during said search-track phase while signals are not being received.

References Cited in the file of this patent

UNITED STATES PATENTS

| | | |
|---|---|---|
| 2,532,347 | Stodala | Dec. 5, 1950 |
| 2,562,309 | Fredrick et al. | July 31, 1951 |
| 2,697,782 | Lawson | Dec. 21, 1954 |
| 2,741,756 | Stocker | Apr. 10, 1956 |
| 2,803,818 | Byrne | Aug. 20, 1957 |